(No Model.)
G. H. ZSCHECH.
WHEEL FOR SAW MILL CARRIAGES.
No. 250,472. Patented Dec. 6, 1881.
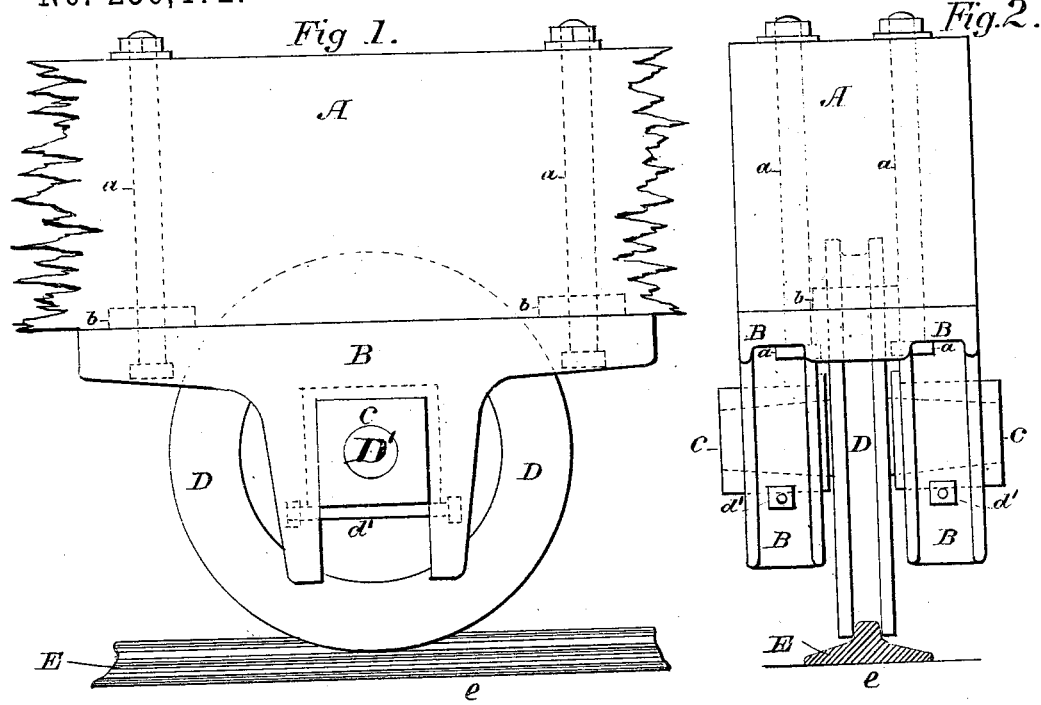
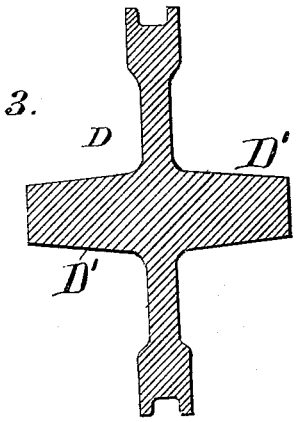
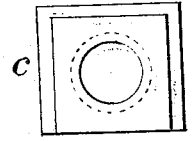
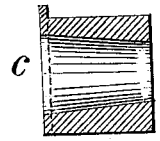
Witnesses:
Gustav Bohn
Albert Meulen
Inventor.
Gustavus H. Zschech

UNITED STATES PATENT OFFICE.

GUSTAVUS H. ZSCHECH, OF INDIANAPOLIS, INDIANA.

WHEEL FOR SAW-MILL CARRIAGES.

SPECIFICATION forming part of Letters Patent No. 250,472, dated December 6, 1881.

Application filed September 17, 1881. (No model.)

*To all whom it may concern:*

Be it known that I, GUSTAVUS H. ZSCHECH, of Indianapolis, in the county of Marion and State of Indiana, have invented certain new and useful Improvements relating to Wheels for Saw-Mill Carriages, of which the following is a specification.

Carriages for heavy sawing are usually mounted on rollers or wheels with flanges running on parallel rails analogous to ordinary railroad-tracks. With machinery of this character, subjected to rough usage, it is not easy to avoid irregularities in motion from various sources, particularly from end-play of the wheels.

I have devised and wrought out in practice means for carrying the carriage with exact uniformity, not only while new, but also after the parts have been subjected to any ordinary amount of wear. I make the bearings tapering. The gravity of the heavy carriage and of the log thereon holds the carriage centered exactly upon the wheels under all circumstances. Taking care to make the rail straight and of uniform width, and to adapt the flanged rim of the wheel accurately thereto, I can depend on the traverse of the carriage being exactly rectilinear and always in a uniform path.

The accompanying drawings form a part of this specification, and represent what I consider the best means of carrying out the invention.

The general construction of the carriage and its relation to the driving-gear and to the saw may be of the ordinary character.

The drawings show the novel parts, with so much of the ordinary parts as is necessary to indicate their relation thereto.

Figure 1 is a side elevation of one of the wheels and of a portion of the carriage and rail adjacent thereto. Fig. 2 is an end view of the same. Fig. 3 is a vertical section through the wheel and bearings. Fig. 4 is a side view of one of the bearing-boxes having the small end of its tapering cavity toward the eye. Fig. 5 is a vertical section in the plane of the axis.

Similar letters of reference indicate like parts in all the figures.

A is the timber frame-work of the carriage. B B are stout cast-iron jaws, fixed thereunder by bolts $a$.

D is a wheel, of cast-iron or other suitable material, having its rim grooved, and having tapering bearings D' cast in one therewith. The bearings are truly turned and fitted loosely in correspondingly-tapered holes in boxes $c$, which are fitted rigidly in the jaws B and secured by bolts $d'$.

E is a rail, bolted or otherwise firmly secured upon a strong foundation, $e$. It will be understood that there are two of the rails E at a proper distance apart, and four or more of the wheels D, each mounted as here shown. Sufficient recesses are formed in the under faces of the timbers A to allow the wheel D to be mounted as shown, and turn freely without touching.

The several boxes $c$ are flanged at their inner ends. The gravity of the carriage and its load, being received through the jaws B and boxes $c$ on the tapering bearings D', holds the flanges of the boxes $c$ firmly out against the inner faces of the jaws B, and holds the body of the wheel clear of the boxes. When the carriage is subjected to concussion, as in receiving a heavy log, the carriage can move to either side to the extent allowed between the boxes $c$ and the side of the wheel; but so soon as the log is at rest, the gravity of the parts, being received on the two tapered bearings of each wheel, urges the carriage into a position which holds the wheels centrally between the boxes. The carriage traverses in that position under all conditions. When the parts are new there is a little room for end-play of the bearings D' in the boxes $c$. The wear of the parts reduces the diameter of the tapering bearings D' and increases the diameter of the tapering hole in the corresponding box $c$. Under all conditions the gravity holds the carriage centrally on the wheel, or, in other words, holds the wheel centrally between the jaws.

Modifications may be made. The taper of the bearings may be increased or diminished. The bearings may be made in a separate short shaft of iron or steel, and secured by keys or otherwise in the body of the wheel, projecting each side with the proper taper. The bearings should be of sufficient length to allow considerable end motion, and the tapering cavity in the box $c$ should be bored large enough to allow some play, even when the work is newest.

The invention effects two important ends—one the yielding of the carriage laterally to a sufficient extent to soften the shock when a heavy log is suddenly rolled against the chocks, and the other the holding of the carriage in a definite and uniform position as the wheels traverse backward and forward on the rails, receiving the load on the tapering bearings D'.

I claim as my invention—

In a saw-mill carriage, the grooved wheels D, with tapering bearings D', in combination with jaws carrying boxes c, which have correspondingly-tapered cavities and a flange abutting against the interior side of the jaws, the whole adapted to serve relatively to the carriage and to the rails E as and for the purposes herein specified.

In testimony whereof I have hereunto set my hand, at Boston, Massachusetts, this 15th day of September, 1881, in the presence of two subscribing witnesses.

GUSTAVUS H. ZSCHECH.

Witnesses:
ALFRED T. SINKER,
JOSEPH EMANUELS.